(12) United States Patent
Toyoizumi et al.

(10) Patent No.: US 11,345,562 B2
(45) Date of Patent: May 31, 2022

(54) POST-PROCESSING APPARATUS AND IMAGE FORMING SYSTEM

(71) Applicant: KONICA MINOLTA, INC., Tokyo (JP)

(72) Inventors: Teruhiko Toyoizumi, Tachikawa (JP); Masayuki Watanabe, Fuchu (JP); Hidenori Mine, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 223 days.

(21) Appl. No.: 16/840,539

(22) Filed: Apr. 6, 2020

(65) Prior Publication Data

US 2020/0317461 A1  Oct. 8, 2020

(30) Foreign Application Priority Data

Apr. 4, 2019 (JP) .............................. JP2019-071823

(51) Int. Cl.
| | |
|---|---|
| *B65H 35/02* | (2006.01) |
| *B65H 35/00* | (2006.01) |
| *B65H 35/04* | (2006.01) |
| *B41J 11/66* | (2006.01) |
| *B26D 7/00* | (2006.01) |
| *B26D 7/28* | (2006.01) |

(52) U.S. Cl.
CPC ............. *B65H 35/008* (2013.01); *B26D 7/00* (2013.01); *B26D 7/28* (2013.01); *B41J 11/663* (2013.01); *B65H 35/02* (2013.01); *B65H 35/04* (2013.01)

(58) Field of Classification Search
CPC . B26D 7/00; B26D 7/28; B41J 11/663; B65H 35/02; B65H 35/04; B65H 35/008

USPC ...................................................... 270/58.08
See application file for complete search history.

(56) References Cited

U.S. PATENT DOCUMENTS

| | | | |
|---|---|---|---|
| 6,978,954 B2 * | 12/2005 | Kroger ................ | B02C 18/0007 241/100 |
| 10,646,878 B1 * | 5/2020 | Chang .................... | B02C 23/02 |

FOREIGN PATENT DOCUMENTS

| | | |
|---|---|---|
| CN | 001199013 A | 11/1998 |
| CN | 102198670 A | 9/2011 |
| CN | 107720041 A | 8/2018 |
| JP | 2000198613 A | 7/2000 |

(Continued)

OTHER PUBLICATIONS

Espacenet machine translation of CN1199013A; http://translationportal.epo.org/emtp/translate/?ACTION=description-retrieval&COUNTRY=CN&ENGINE=google&FORMAT=docdb&KIND=A&LOCALE=en_EP&NUMBER=1199013&OPS=ops.epo.org/3.2&SRCLANG=zh&TRGLANG=en (Year: 1998).*

(Continued)

*Primary Examiner* — Leslie A Nicholson, III
(74) *Attorney, Agent, or Firm* — Cantor Colburn LLP (57) ABSTRACT

A post-processing apparatus includes: a cutter that cuts a transported sheet; a waste bin that stores a cutting waste generated by a cutting operation of the cutter and falling from the cutter; a sensor that detects the cutting waste at a predetermined position in a depth direction in the waste bin; and a hardware processor that controls the cutting operation of the cutter according to a cutting mode, sets a predetermined value according to the cutting mode when the sensor detects the cutting waste, counts the number of times of cutting by the cutter after the sensor starts to detect the cutting waste, and detects that the waste bin is full when the counted number of times of cutting reaches the predetermined value.

9 Claims, 8 Drawing Sheets

(56) References Cited

FOREIGN PATENT DOCUMENTS

JP          2007061967 A  *  3/2007
JP          2011126647 A     6/2011

OTHER PUBLICATIONS

Espacenet machine translation of CN102198670A; http://translationportal.epo.org/emtp/translate/?ACTION=description-retrieval&COUNTRY=CN&ENGINE=google&FORMAT=docdb&KIND=A&LOCALE=en_EP&NUMBER=102198670&OPS=ops.epo.org/3.2&SRCLANG=zh&TRGLANG=en (Year: 2010).*
CNIPA First Office Action for corresponding CN Application No. 202010258818.9; dated Jul. 2, 2021.
CNIPA Second Office Action for corresponding CN Application No. 202010258818.9; dated Feb. 9, 2022.

* cited by examiner

FOUR-SIDE CUTTING

FIG. 2B

MULTIPLE CUTTING
(DIVIDE A4 INTO TWO PIECES)

FIG. 2C

MULTIPLE CUTTING (CARD)

FIG. 2D

MULTIPLE CUTTING (BUSINESS CARD)

| CUTTING MODE | FIRST SENSOR | SECOND SENSOR | PREDETERMINED VALUE | |
|---|---|---|---|---|
| FOUR-SIDE CUTTING | NO DETECTION | NO DETECTION | – | — 242 |
| | DETECTION | NO DETECTION | 300 | |
| | NO DETECTION | DETECTION | 300 | |
| | DETECTION | DETECTION | 100 | |
| MULTIPLE CUTTING | NO DETECTION | NO DETECTION | – | |
| | DETECTION | NO DETECTION | 200 | |
| | NO DETECTION | DETECTION | 200 | |
| | DETECTION | DETECTION | 100 | |

FIG. 7B

| CUTTING MODE | FIRST SENSOR | SECOND SENSOR | PREDETERMINED VALUE | |
|---|---|---|---|---|
| A4 CUTTING | NO DETECTION | NO DETECTION | – | — 243 |
| | DETECTION | NO DETECTION | 300 | |
| | NO DETECTION | DETECTION | 300 | |
| | DETECTION | DETECTION | 100 | |
| A3 CUTTING | NO DETECTION | NO DETECTION | – | |
| | DETECTION | NO DETECTION | 200 | |
| | NO DETECTION | DETECTION | 200 | |
| | DETECTION | DETECTION | 100 | |

FIG. 9

POST-PROCESSING APPARATUS AND IMAGE FORMING SYSTEM

CROSS-REFERENCE TO RELATED APPLICATIONS

The present invention claims priority under 35 U.S.C. § 119 to Japanese Patent Application No. 2019-071823 filed on Apr. 4, 2019 is incorporated herein by reference in its entirety.

BACKGROUND

Technological Field

The present invention relates to a post-processing apparatus and an image forming system.

Description of the Related Art

A post-processing apparatus that performs cutting processing on a sheet on which an image is formed by an image forming apparatus, such as cutting an end of the sheet or dividing the sheet into a plurality of regions, has been used. In the post-processing apparatus, a waste bin for storing cutting waste generated by the cutting is provided below the cutter.

If the amount of cutting waste in the waste bin exceeds the allowable amount, a problem occurs in which the cutting waste flows backward or the cutting waste adheres to the product created by the cutting processing and is discharged. Therefore, a sensor for detecting a full state of the waste bin is provided in a sheet cutting apparatus, so that the cutting processing is stopped when cutting waste is stacked up to a predetermined height (refer to JP 2000-198613A). When the user removes the cutting waste from the waste bin and sets the waste bin again, the cutting processing is restarted.

A cutting apparatus has been proposed in which a position where cutting waste falls from the cutter and a position where cutting waste is stored in the waste bin can be relatively displaced (refer to JP 2011-126647A). In this apparatus, the cutter or the waste bin is moved to prevent the cutting waste from being intensively stacked at a specific location in the waste bin.

SUMMARY

However, in the post-processing apparatus that performs cutting processing, the stacking shape of cutting waste differs depending on a cutter to be used or the amount of cutting (cutting width). Therefore, if it is determined that the waste bin is full when the sensor provided in the waste bin detects cutting waste, there is a possibility that the waste bin still has room in practice. For this reason, the capacity of the waste bin may not be utilized effectively. If the apparatus is stopped long before the waste bin becomes full, there is a problem that productivity is reduced.

Figure 9:
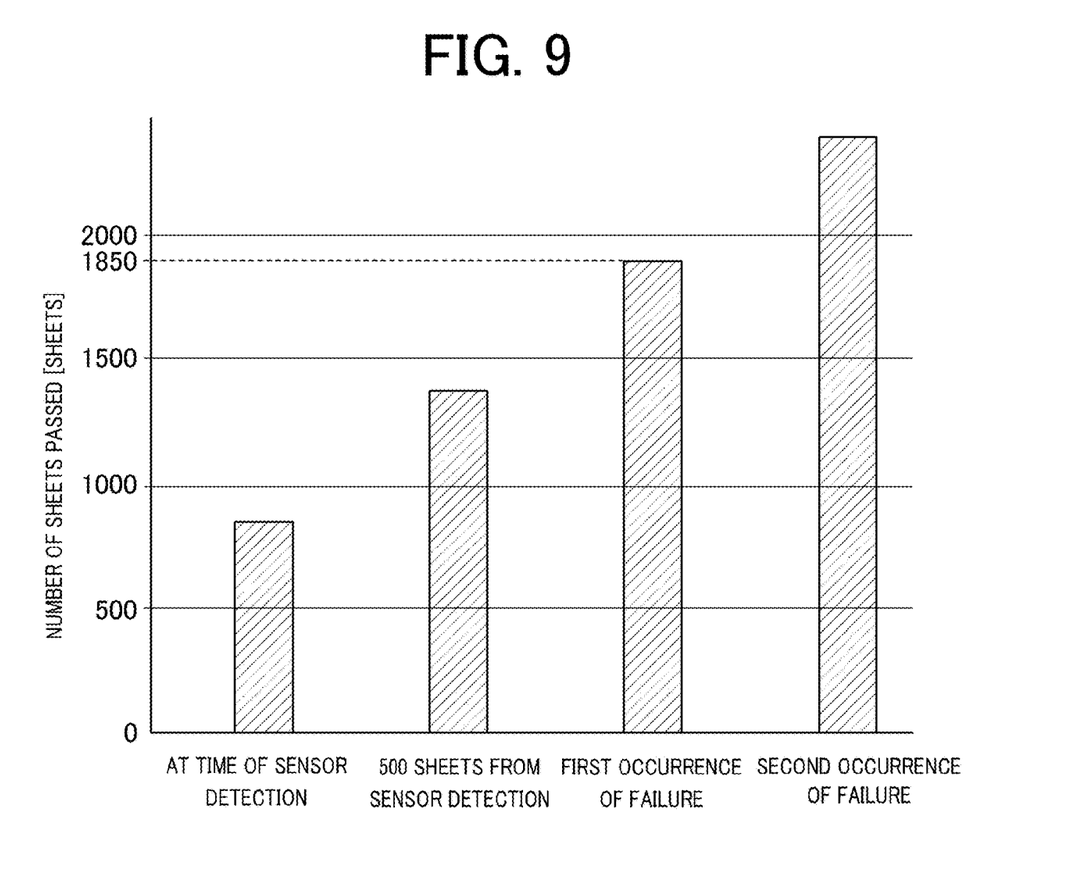
FIG. 9 is a diagram for describing a problem in the related art.

FIG. 9 shows the number of sheets passed when a sensor detects cutting waste, when 500 more sheets are passed from sensor detection, and when a failure occurs (first time and second time) in a case where cutting processing is performed on paper having a basis weight of 81.4 $g/m^2$. The first time and the second time at the time of occurrence of a failure are the respective experimental results when the same experiment was tried twice. If the full state is determined when the sensor detects cutting waste even though the actual failure occurs after 1850 sheets, the cutting processing is stopped even though the cutting processing is still possible. It would be good if a sensor for detecting cutting waste can be placed on the top surface of the waste bin. However, considering the restrictions on the apparatus, the stability of the stacking state due to the dropping of cutting waste, and the like, the sensor needs to be disposed to some extent below the top surface of the waste bin.

The present invention has been made in view of the aforementioned problems in the related art, and it is an object of the present invention to prevent a reduction in productivity due to removal of cutting waste by effectively utilizing the capacity of a waste bin for cutting waste.

To achieve at least one of the abovementioned objects, according to an aspect of the present invention, a post-processing apparatus reflecting one aspect of the present invention comprises: a cutter that cuts a transported sheet; a waste bin that stores a cutting waste generated by a cutting operation of the cutter and falling from the cutter; a sensor that detects the cutting waste at a predetermined position in a depth direction in the waste bin; and a hardware processor that controls the cutting operation of the cutter according to a cutting mode, sets a predetermined value according to the cutting mode when the sensor detects the cutting waste, counts the number of times of cutting by the cutter after the sensor starts to detect the cutting waste, and detects that the waste bin is full when the counted number of times of cutting reaches the predetermined value.

To achieve at least one of the abovementioned objects, according to another aspect of the present invention, an image forming system reflecting one aspect of the present invention comprises: an image forming apparatus that forms an image on a sheet; and the post-processing apparatus described above.

BRIEF DESCRIPTION OF THE DRAWINGS

The advantages and features provided by one or more embodiments of the invention will become more fully understood from the detailed description given hereinbelow and the appended drawings which are given by way of illustration only, and thus are no intended as a definition of the limits of the present invention, wherein.

DETAILED DESCRIPTION OF THE EMBODIMENTS

Hereinafter, one or more embodiments of the present invention will be described with reference to the drawings. However, the scope of the invention is not limited to the disclosed embodiments.

First Embodiment

Figure 1:
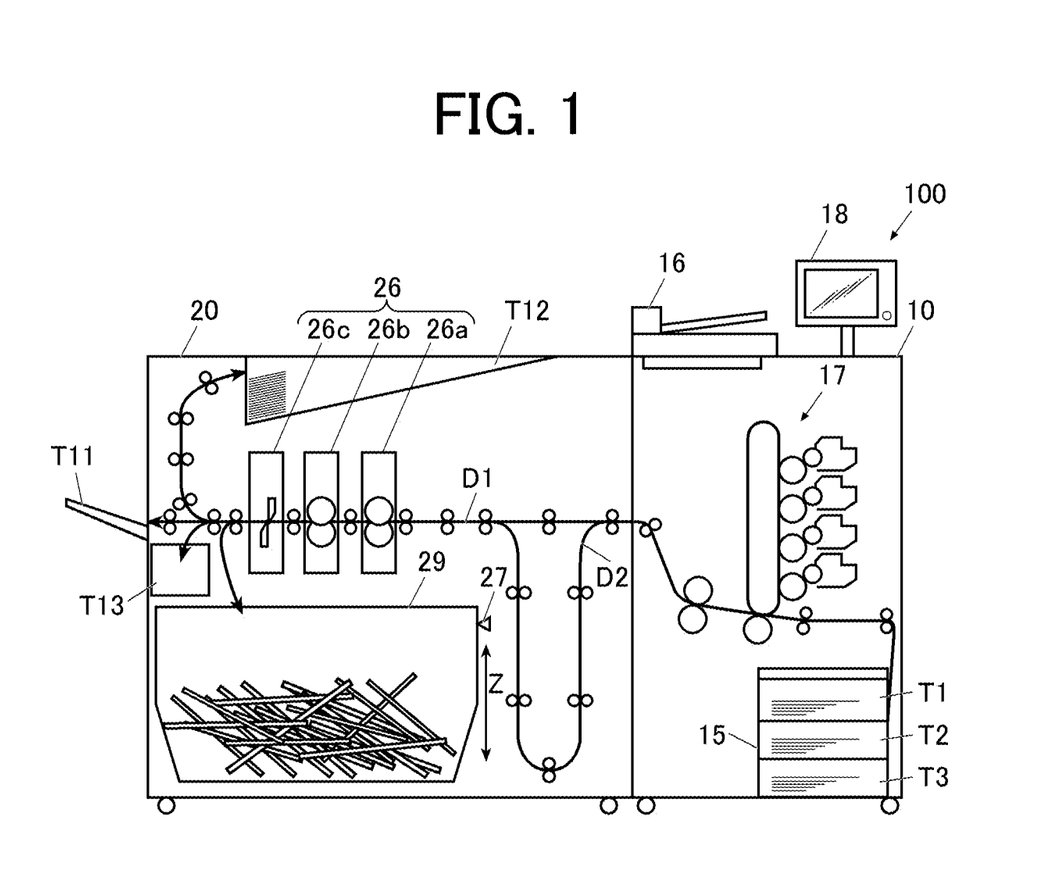
FIG. 1 is a configuration diagram of an image forming system according to a first embodiment of the present invention.

FIG. 1 is a configuration diagram of an image forming system 100 according to a first embodiment of the present invention. The image forming system 100 is configured to include an image forming apparatus 10 that forms an image on paper as a sheet and a post-processing apparatus 20 that performs post-processing on the paper on which an image is formed by the image forming apparatus 10.

The image forming apparatus 10 forms an image on paper according to an operation instruction input from an operation display 18 or an image forming instruction received from a personal computer (PC) or the like through a communication network. The image forming apparatus 10 transports the paper after image formation to the post-processing apparatus 20.

The image forming apparatus 10 includes a paper feeder 15, an image reader 16, an image former 17, an operation display 18, and the like.

The paper feeder 15 includes a plurality of paper feed trays T1 to T3 capable of storing sheets of paper having different sizes, types (paper types), basis weights, and the like, and paper stored in the designated paper feed trays T1 to T3 is fed to the image former 17.

The image reader 16 reads a document and generates image data. Specifically, the image reader 16 reads reflected light, which is reflected by the document after emission from the light source, using a charge coupled device (CCD) image sensor or the like.

The image former 17 forms an image on the paper. The image former 17 charges a photoconductor with a charger, forms an electrostatic latent image by exposing and scanning the photoconductor with a laser beam emitted from an exposer based on image data, develops the electrostatic latent image with toner using a developer, transfers a toner image onto the paper using a transferrer, and fixes the toner image on the paper using a fixer.

The operation display 18 is configured by a liquid crystal display (LCD), and includes a display for displaying various screens and an operation interface configured by various keys or a touch panel stacked on the display. The operation display 18 outputs an operation signal input by a touch operation or a key operation to a central processing unit (CPU) 11 (refer to FIG. 3).

The post-processing apparatus 20 is a cutter that performs cutting processing on paper. The post-processing apparatus 20 performs cutting processing on the paper transported from the image forming apparatus 10 as necessary, and discharges a product created by the cutting processing to paper discharge trays T11 and T12 or a card tray T13.

The post-processing apparatus 20 includes a transport path D1, a cutter 26, a sensor 27, a waste bin 29, and the like.

In the transport path D1, a long paper transport path D2 that branches off from the transport path D1 and merges downstream is provided. The long paper transport path D2 is used as a buffer when transporting long paper.

The cutter 26 performs cutting processing for cutting the transported paper. The cutter 26 includes FD cutters 26a and 26b and a CD cutter 26c at a plurality of positions on the transport path D1 of the paper.

The FD cutters 26a and 26b are slitters that cut the paper along the feed direction. The FD cutter 26a is a top and bottom slitter that cuts ends (rear side and front side) of the paper in a direction perpendicular to the feed direction. The FD cutter 26b is a dove cutting slitter that cuts a margin between products adjacent to each other in a direction perpendicular to the feed direction of the paper.

The CD cutter 26c is a guillotine cutter that cuts the paper along a direction (cross direction) perpendicular to the feed direction.

The use of the FD cutters 26a and 26b and the CD cutter 26c is determined according to the cutting mode. The cutting mode refers to a cutting control method determined by a cutting type, paper size, paper type, paper basis weight, and the like.

The cutting mode classified by the cutting type will be described with reference to FIGS. 2A, 2B, 2C, and 2D.

Figure 2A:
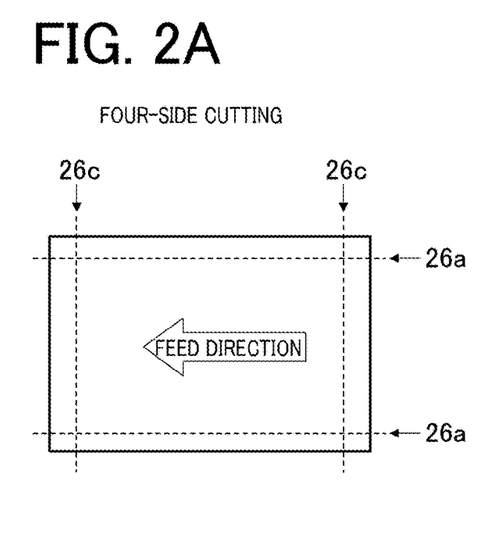
FIG. 2A is a cutting example in a four-side cutting mode.

FIG. 2A is a cutting example in a four-side cutting mode. The four-side cutting mode is a mode in which four ends of paper are cut to create one product from one sheet of paper. Specifically, both ends (rear end and front end) of paper in the CD direction are cut by the FD cutter 26a. The leading end and the trailing end of the paper in the FD direction are cut by the CD cutter 26c.

Figure 2B:
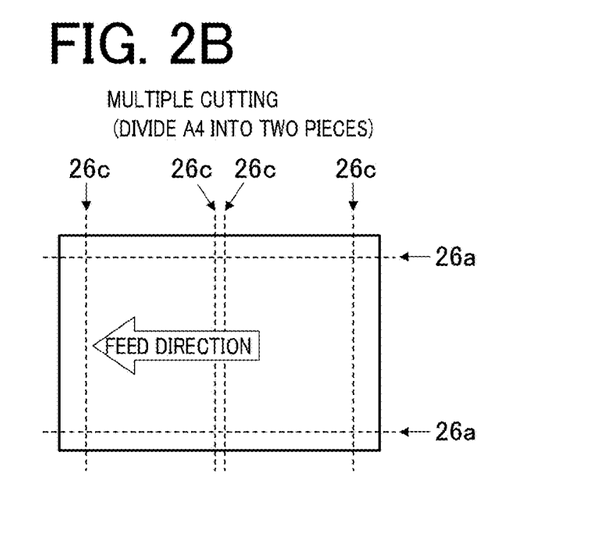
FIG. 2B is a cutting example in a multiple cutting mode.
Figure 2C:
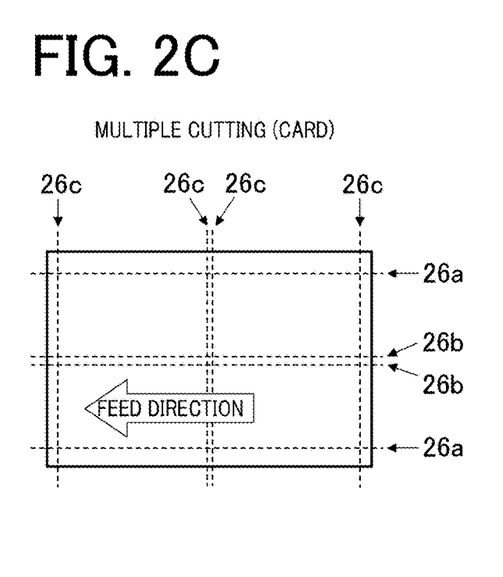
FIG. 2C is a cutting example in a multiple cutting mode.
Figure 2D:
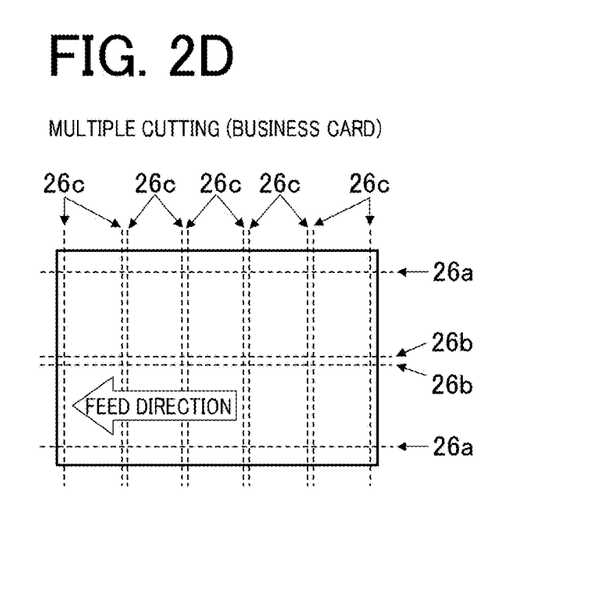
FIG. 2D is a cutting example in a multiple cutting mode.

FIGS. 2B, 2C, and 2D are cutting examples in a multiple cutting mode. The multiple cutting mode is a mode in which, in addition to the four ends of the paper, the paper is cut at one or more locations along the FD direction or the CD direction to create a plurality of products from one sheet of paper.

In the multiple cutting mode illustrated in FIG. 2B in which paper having an A4 size is divided into two parts in the FD direction, both ends (rear end and front end) of the paper in the CD direction are cut by the FD cutter 26a. The leading end and the trailing end of the paper in the FD direction and the margin between the products adjacent to each other in the FD direction are cut by the CD cutter 26c.

In the multiple cutting mode for creating cards illustrated in FIG. 2C, both ends (rear end and front end) of the paper in the CD direction are cut by the FD cutter 26a. The margin between the products adjacent to each other in the CD direction of the paper is cut by the FD cutter 26b. The leading end and the trailing end of the paper in the FD direction and the margin between the products adjacent to each other in the FD direction are cut by the CD cutter 26c.

In the multiple cutting mode for creating business cards illustrated in FIG. 2D, both ends (rear end and front end) of the paper in the CD direction are cut by the FD cutter 26a. The margin between the products adjacent to each other in the CD direction of the paper is cut by the FD cutter 26b. The leading end and the trailing end of the paper in the FD direction and the margin between the products adjacent to each other in the FD direction are cut by the CD cutter 26c.

Each of the FD cutters 26a and 26b and the CD cutter 26c configuring the cutter 26 may be modularized so as to be detachable from the main body of the post-processing apparatus 20. In this case, the arrangement order of each module can be changed.

Figure 3:
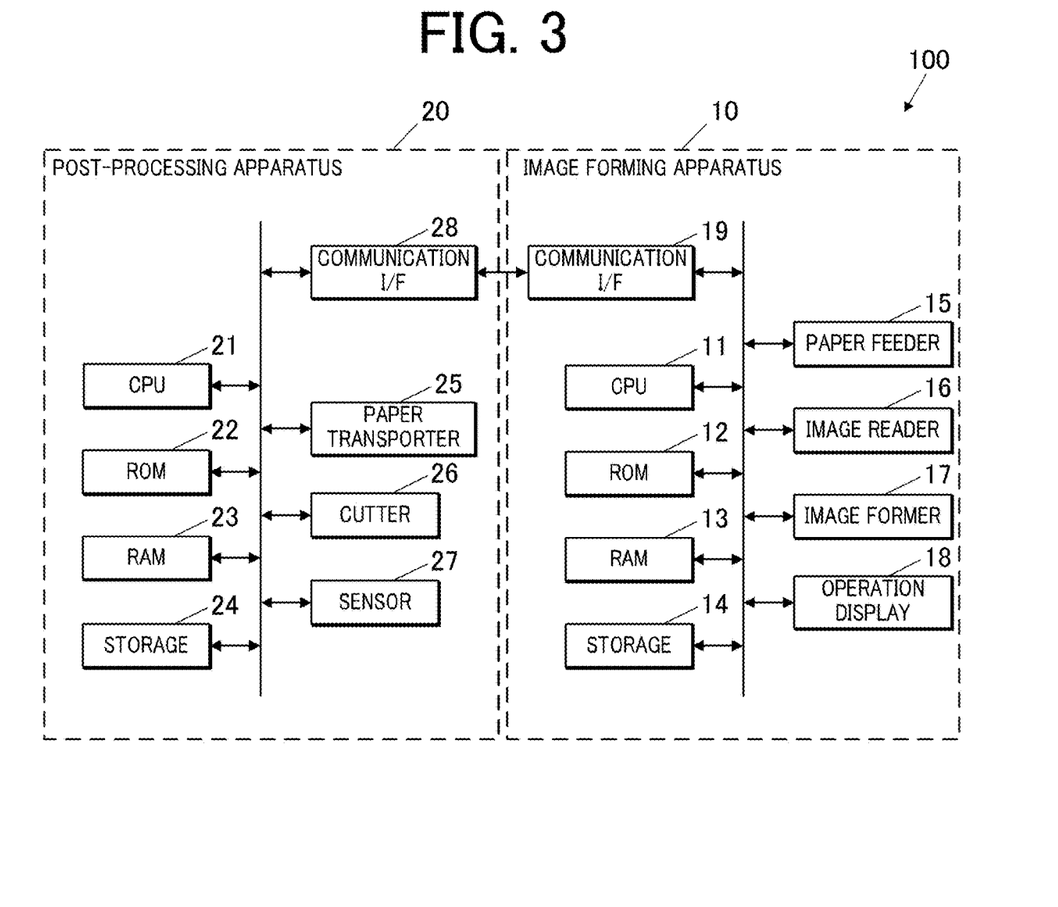
FIG. 3 is a block diagram illustrating the functional configuration of the image forming system.

The sensor 27 detects cutting waste at a predetermined position in a depth direction (Z direction illustrated in FIG. 1) in the waste bin 29, and outputs the detection result to a CPU 21 (hardware processor) (refer to FIG. 3). That is, the sensor 27 detects that cutting waste has been stacked up to a certain amount in the waste bin 29.

The waste bin 29 is provided below the cutter 26, and stores cutting waste generated by the cutting operation of the cutter 26 and falling from the cutter 26. The user opens the door of the post-processing apparatus 20, takes out the waste bin 29, and discards the cutting waste in the waste bin 29.

FIG. 3 is a block diagram illustrating the functional configuration of the image forming system 100.

The image forming apparatus 10 includes the CPU 11, a read only memory (ROM) 12, a random access memory (RAM) 13, a storage 14, the paper feeder 15, the image reader 16, the image former 17, the operation display 18, a communication interface (I/F) 19, and the like. The description of the functional units already described will be omitted.

The CPU 11 reads a program stored in the ROM 12 and loads the program to the RAM 13 to control the operation of each unit of the image forming apparatus 10 in cooperation with the program.

The ROM 12 is a nonvolatile semiconductor memory or the like, and stores a system program, various processing programs that can be executed on the system program, various kinds of data, and the like.

The RAM 13 is a volatile semiconductor memory or the like, and forms a work area where programs, input or output data, parameters, and the like read from the ROM 12 are temporarily stored in various kinds of processing executed by the CPU 11.

Th The storage 14 is a hard disk drive (HDD), a nonvolatile semiconductor memory, or the like, and stores various kinds of data.

The communication I/F 19 is a network interface card (NIC), a modem, or the like, and transmits and receives data to and from the post-processing apparatus 20 or a PC.

The post-processing apparatus 20 includes the CPU 21, a ROM 22, a RAM 23, a storage 24, a paper transporter 25, the cutter 26, the sensor 27, a communication I/F 28, and the like.

The CPU 21, the ROM 22, and the RAM 23 are the same as the CPU 11, the ROM 12, and the RAM 13 except that the control target of the CPU 21 is the post-processing apparatus 20.

The storage 24 is an HDD, a nonvolatile semiconductor memory, or the like, and stores various kinds of data. For example, the storage 24 stores a predetermined value correspondence table 241.

Figure 4:
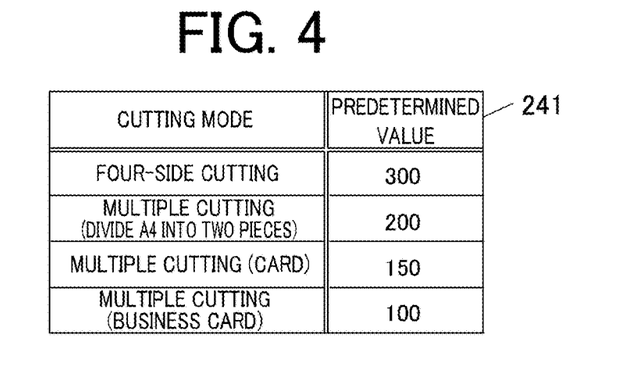
FIG. 4 is a data configuration example of a predetermined value correspondence table.

FIG. 4 shows a data configuration example of the predetermined value correspondence table 241. In the predetermined value correspondence table 241, predetermined values are associated with cutting modes classified by the cutting type. The predetermined value is used as the number of times of cutting by the cutter 26 from when the sensor 27 starts to detect cutting waste to when the sensor 27 detects that the waste bin 29 is full.

The paper transporter 25 transports the paper transported from the image forming apparatus 10 until the paper is discharged to the paper discharge trays T11 and T12 or the card tray T13.

The communication I/F 28 is an NIC, a modem, or the like, and transmits and receives data to and from the image forming apparatus 10.

The CPU 21 controls the cutting operation of the cutter 26 according to the cutting mode.

The CPU 21 determines the cutting mode based on, for example, the size, type, or basis weight of the paper.

The CPU 21 changes the cutting position of the paper according to the cutting mode. For example, as illustrated in FIGS. 2A, 2B, 2C, and 2D, the position where the paper is cut along the FD direction or the CD direction differs for each cutting mode (cutting type).

The CPU 21 changes the shape or size of the cutting waste according to the cutting mode. For example, as illustrated in FIGS. 2A, 2B, 2C, and 2D, the shape or size of the margin between the products or the ends of the paper cut in the FD direction or the CD direction differs for each cutting mode (cutting type).

The CPU 21 sets a predetermined value according to the cutting mode when the sensor 27 detects cutting waste.

The CPU 21 counts the number of times of cutting by the cutter 26 after the sensor 27 starts to detect cutting waste. The counted number of times of cutting is the number of cutting operations of the cutter 26. As the number of cutting operations, the sum of the number of cutting operations in each of the FD cutters 26a and 26b and the CD cutter 26c may be counted. Alternatively, the number of sheets of paper cut by the cutter 26 may be counted as the number of times of cutting.

The CPU 21 detects that the waste bin 29 is full when the counted number of times of cutting reaches a predetermined value after the sensor 27 starts to detect cutting waste.

Next, an operation in the first embodiment will be described.

Figure 5:
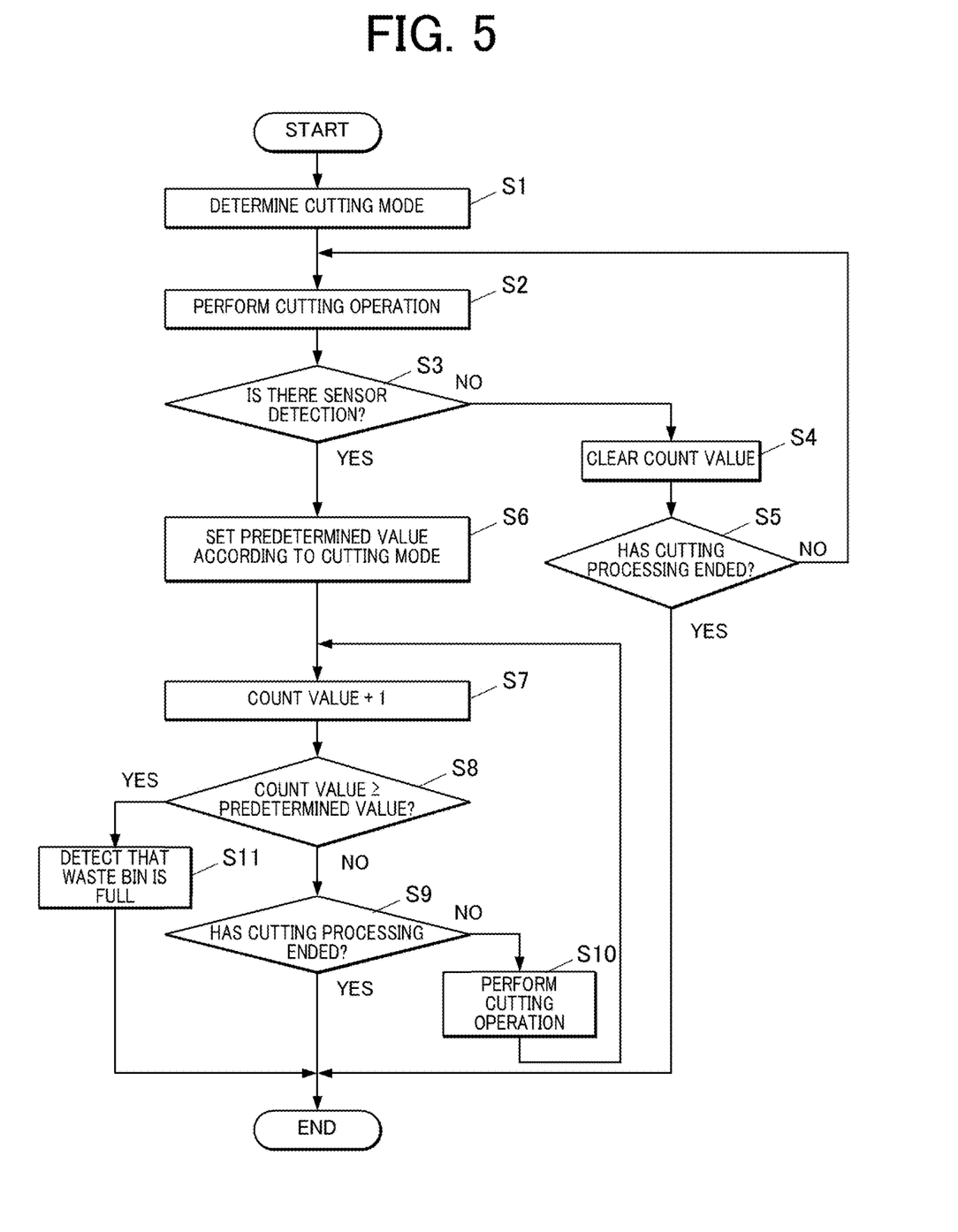
FIG. 5 is a flowchart illustrating a first waste bin full detection process.

FIG. 5 is a flowchart illustrating a first waste bin full detection process executed by the post-processing apparatus 20. This process is realized by software processing in cooperation with the CPU 21 and a program stored in the ROM 22.

When the cutting processing is performed in the image forming system 100, an operation instruction input from the operation display 18 of the image forming apparatus 10 or an image forming instruction received from a PC or the like through a communication network includes cutting setting information relevant to the cutting processing. The cutting setting information includes information (size, type, basis weight, and the like) regarding paper to be cut, a cutting direction, a cutting position, and the like. The CPU 11 of the image forming apparatus 10 transmits the cutting setting information to the post-processing apparatus 20 through the communication I/F 19.

The CPU 21 of the post-processing apparatus 20 receives the cutting setting information from the image forming apparatus 10 through the communication I/F 28, and determines the cutting mode based on the cutting setting information (step S1). Specifically, the CPU 21 determines the cutting mode based on the paper size, paper type, paper basis weight, cutting direction, cutting position, and the like. The CPU 21 determines whether or not each of the FD cutters 26a and 26b and the CD cutter 26c is to be used according to the cutting mode.

Then, the CPU 21 controls the cutter 26 to perform a cutting operation on the paper transported from the image forming apparatus 10 (step S2). At this time, the CPU 21 controls the cutter 26 to perform a cutting operation at a position corresponding to the cutting mode using a cutter (FD cutters 26a and 26b, CD cutter 26c) corresponding to the cutting mode.

Then, the CPU 21 determines whether or not the sensor 27 has detected cutting waste based on the output result of the sensor 27 (step S3). That is, the CPU 21 determines whether or not the cutting waste has been stacked up to a predetermined position (depth) in the waste bin 29.

If the sensor 27 has not detected cutting waste (step S3; NO), the CPU 21 clears the count value (step S4), and determines whether or not the cutting processing has ended (step S5).

If the cutting processing has not ended (step S5; NO), the process returns to step S2 to repeat the processing.

If the sensor 27 detects cutting waste in step S3 (step S3; YES), that is, if the cutting waste is stacked up to a predetermined position (depth) in the waste bin 29, the CPU 21 sets a predetermined value according to the current cutting mode (step S6). Specifically, the CPU 21 acquires a predetermined value corresponding to the cutting mode (cutting type) from the predetermined value correspondence table 241 stored in the storage 24, and sets this value.

Then, the CPU 21 adds 1 to the count value (step S7). Since the count value is cleared in step S4, the count value is 0 when the sensor 27 detects the cutting waste from the state in which no cutting waste is detected. That is, the CPU 21 counts the number of times of cutting by the cutter 26 after the sensor 27 starts to detect cutting waste.

Then, the CPU 21 determines whether or not the count value is equal to or greater than the predetermined value (step S8).

If the count value is less than the predetermined value (step S8; NO), the CPU 21 determines whether or not the cutting processing has ended (step S9).

If the cutting processing has not ended (step S9; NO), the CPU 21 controls the cutter 26 to perform a cutting operation on the paper transported from the image forming apparatus 10 (step S10), and returns to step S7 to repeat the processing.

If the count value is equal to or greater than the predetermined value in step S8 (step S8; YES), the CPU 21 detects that the waste bin 29 is full (step S11). For example, the CPU 21 transmits information indicating that the waste bin 29 is full to the image forming apparatus 10 through the communication I/F 28. In the image forming apparatus 10, based on the information received from the post-processing apparatus 20, the CPU 11 causes the operation display 18 to display a message notifying that the waste bin 29 is full, a message prompting disposal of cutting waste, or the like.

If the cutting processing has ended in step S5 (step S5; YES), the first waste bin full detection process ends when the cutting processing has ended in step S9 (step S9; YES) or after step S11.

After step S11, the user discards the cutting waste in the waste bin 29, and sets the waste bin 29 from which the cutting waste has been removed in the post-processing apparatus 20. Thereafter, the CPU 21 restarts the image forming processing and the cutting processing in the image forming system 100.

As described above, according to the first embodiment, a predetermined value corresponding to the cutting mode is set, and it is detected that the waste bin 29 is full when the number of times of cutting by the cutter 26 reaches the predetermined value. Therefore, it is possible to prevent a reduction in productivity due to removal of cutting waste by effectively utilizing the capacity of the waste bin 29 for cutting waste.

In the first embodiment, the case has been described in which a predetermined value is associated with the cutting mode classified by the cutting type in the predetermined value correspondence table 241. However, a predetermined value may be associated in advance with the cutting mode classified by the paper size, paper type, and paper basis weight, and the predetermined value corresponding to the paper size, paper type, and paper basis weight may be used.

By preparing an appropriate predetermined value in advance for each of the cutting modes classified by the cutting type, paper size, paper type, paper basis weight, and the like, it is possible to prompt disposal of cutting waste in a state in which the waste bin 29 is almost full. Therefore, it is possible to prevent the cutting processing from being interrupted long before the full state.

Second Embodiment

Next, a second embodiment to which the present invention is applied will be described.

Since an image forming system according to the second embodiment has approximately the same configuration as the image forming system 100 according to the first embodiment, FIGS. 1 and 3 are used, and the description of the same configuration as in the first embodiment will be omitted. Hereinafter, the characteristic configuration and processing of the second embodiment will be described.

In the second embodiment, the post-processing apparatus 20 includes a first sensor 31 and a second sensor 32, which are provided at different positions in the feed direction of paper, as the sensor 27 for detecting cutting waste at a predetermined position in the depth direction in the waste bin 29.

Figure 6A:
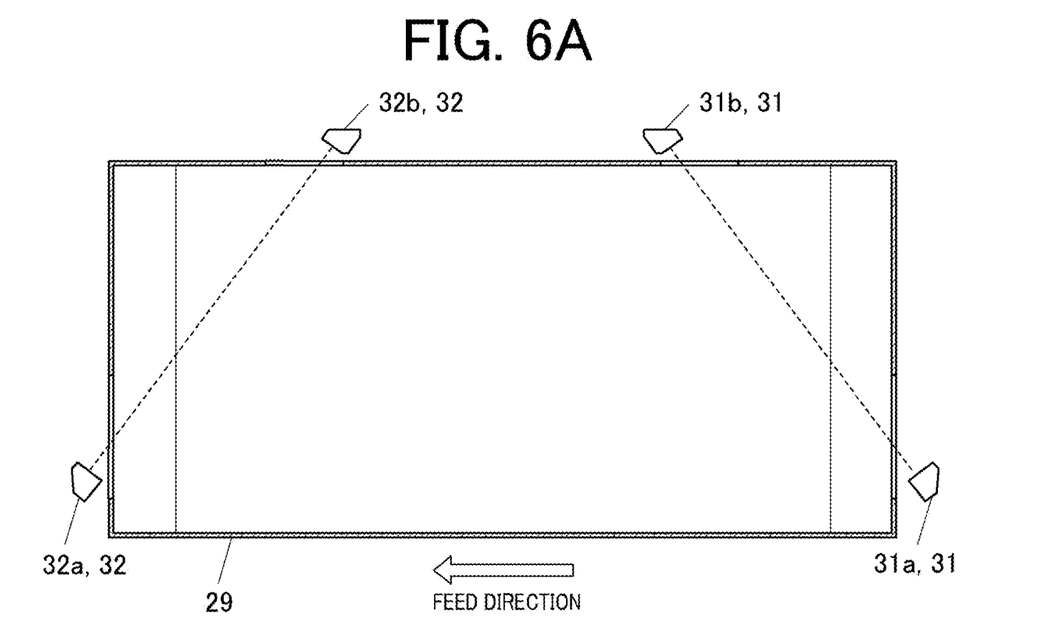
FIG. 6A is a top sectional view of a waste bin according to a second embodiment.
Figure 6B:
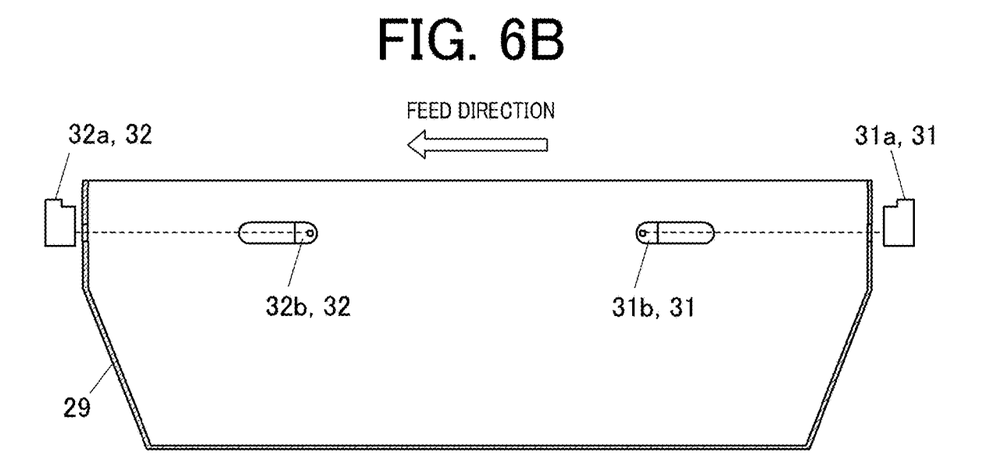
FIG. 6B is a front sectional view of a waste bin.

The installation positions of the first sensor 31 and the second sensor 32 with respect to the waste bin 29 will be described with reference to FIGS. 6A and 6B. FIG. 6A is a top sectional view of the waste bin 29, and FIG. 6B is a front sectional view of the waste bin 29. In FIGS. 6A and 6B, it is assumed that the paper is transported from right to left.

The controller 5 determines whether or not the first ultraviolet irradiator 61 has performed the thickening operation (ultraviolet irradiation) on the ink in the cleaning target region (step S102). If it is determined that the thickening operation has not been performed ("No" in step S102), the controller 5 determines that the residual ink is non-thickened ink, and causes the wiper 431 to be in contact with the intermediate transfer body 10 and to wipe the non-thickened ink (step S103).

When it is determined that the thickening operation is has been performed ("Yes" in step S102), the contoller 5 determines whether or not there is a thickened-ink-covered region on the transfer surface 10a (that is, whether or not there is solid ink having area larger than the reference area) by either of the two methods described above (Step S104). When it is determined that there is no thickened-ink-covered region ("No" in step S104), the controller 5 determines that the thickened ink is dot ink, and causes the scraper 421 to be in contact with the intermediate transfer body 10 and to remove the dot ink (step S105).

When it is determined that there is a thickened-ink-covered region ("Yes" in step S104), the contoller 5 determines whether or not there is thickened ink having area less than the reference area (step S106).

Next, an operation in the second embodiment will be described.

Figure 8:
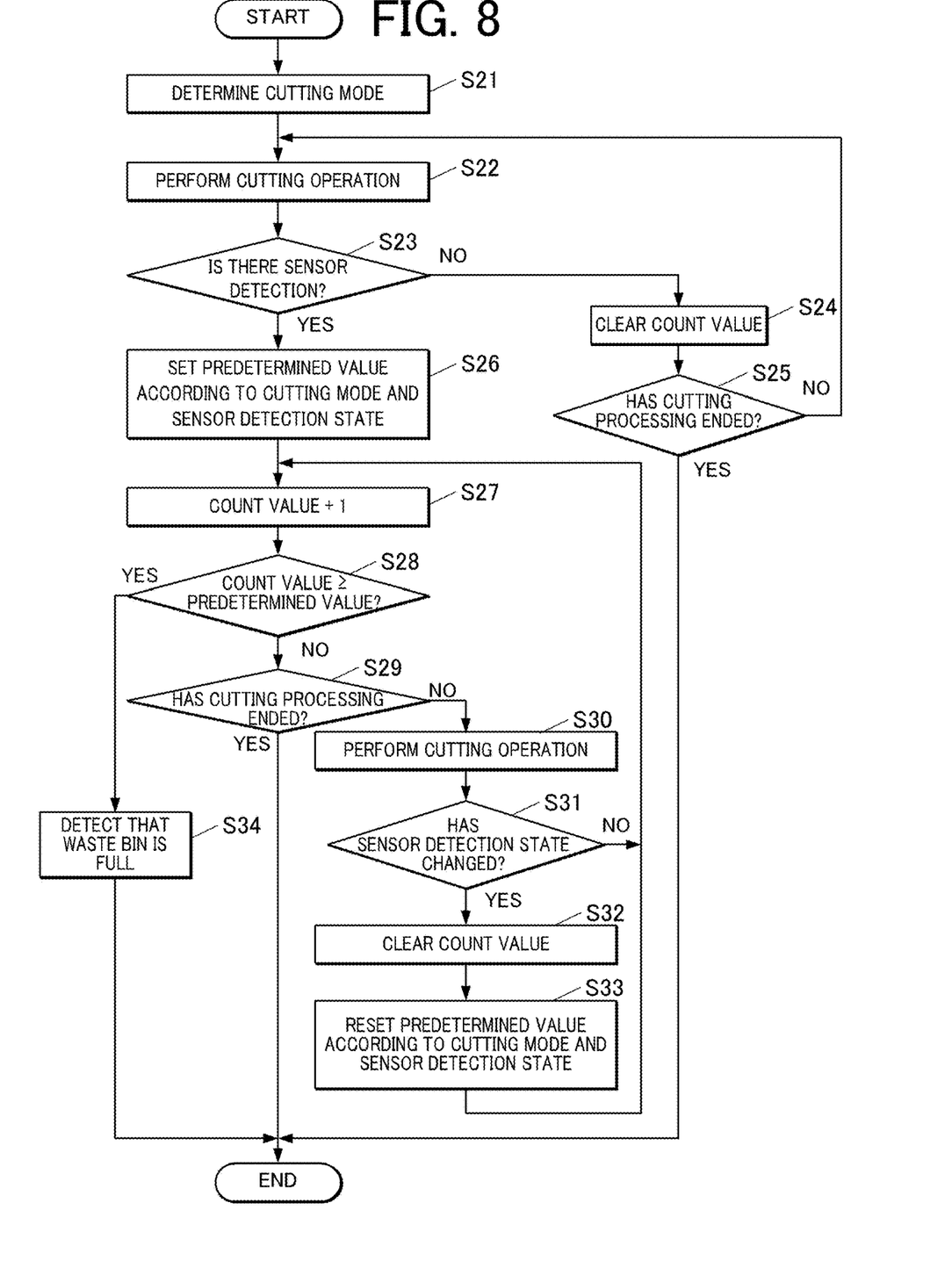
FIG. 8 is a flowchart illustrating a second waste bin full detection process.

FIG. 8 is a flowchart illustrating a second waste bin full detection process executed by the post-processing apparatus 20. This process is realized by software processing in cooperation with the CPU 21 and a program stored in the ROM 22.

First, the CPU 21 receives cutting setting information from the image forming apparatus 10 through the communication I/F 28, and determines the cutting mode based on the cutting setting information (step S21).

Then, the CPU 21 controls the cutter 26 to perform a cutting operation on the paper transported from the image forming apparatus 10 (step S22).

Then, the CPU 21 determines whether or not any of sensors has detected cutting waste based on the output results of the first sensor 31 and the second sensor 32 (step S23).

If cutting waste is not detected by any of the first sensor 31 and the second sensor 32 (step S23; NO), the CPU 21 clears the count value (step S24), and determines whether or not the cutting processing has ended (step S25).

If the cutting processing has not ended (step S25; NO), the process returns to step S22 to repeat the processing.

Figure 7A:
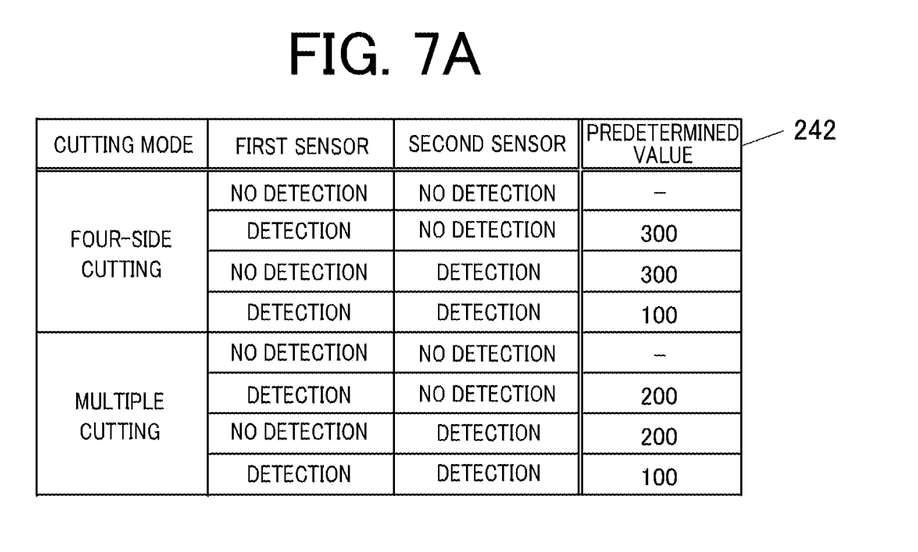
FIG. 7A is a data configuration example of a predetermined value correspondence table.
Figure 7B:
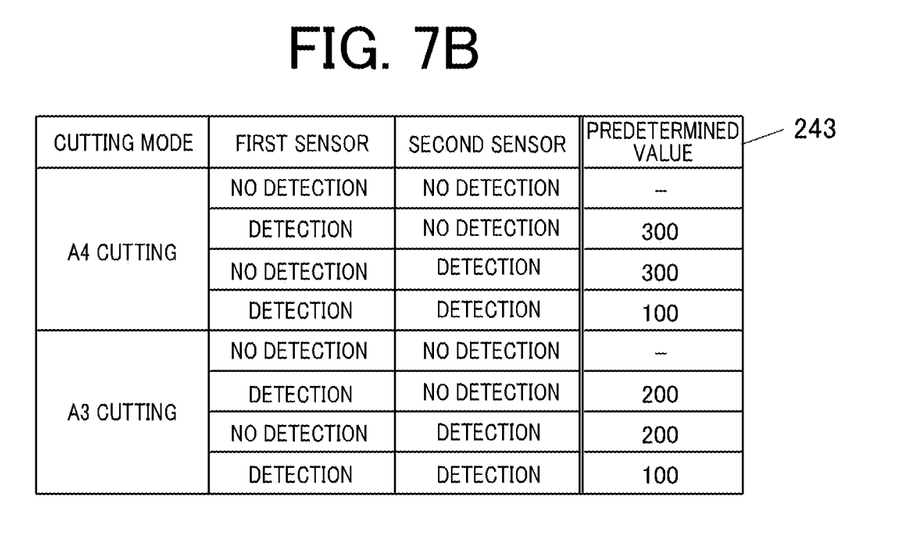
FIG. 7B is a data configuration example of a predetermined value correspondence table.

If any of the sensors detects cutting waste based on the output results of the first sensor 31 and the second sensor 32 in step S23 (step S23; YES), the CPU 21 sets a predetermined value according to the current cutting mode and the cutting waste detection states of the first sensor 31 and the second sensor 32 (step S26). Specifically, the CPU 21 acquires a predetermined value, which corresponds to the combination of the cutting mode classified by the cutting type or the paper size and the detection state of the sensor, from the predetermined value correspondence table 242 or the predetermined value correspondence table 243 stored in the storage 24, and set this value Then, the CPU 21 adds 1 to the count value (step S27). That is, the CPU 21 counts the number of times of cutting by the cutter 26 after the first sensor 31 or the second sensor 32 starts to detect cutting waste.

Then, the CPU 21 determines whether or not the count value is equal to or greater than the predetermined value (step S28).

If the count value is less than the predetermined value (step S28; NO), the CPU 21 determines whether or not the cutting processing has ended (step S29).

If the cutting processing has not ended (step S29; NO), the CPU 21 controls the cutter 26 to perform a cutting operation on the paper transported from the image forming apparatus 10 (step S30).

Then, the CPU 21 determines whether or not the detection state of the sensor has changed based on the output results of the first sensor 31 and the second sensor 32 (step S31).

If the detection state of the sensor has not changed (step S31; NO), the process returns to step S27 to repeat the processing.

If the detection state of the sensor has changed in step S31 (step S31; YES), the CPU 21 clears the count value (step S32), and resets the predetermined value according to the current cutting mode and the cutting waste detection states of the first sensor 31 and the second sensor 32 (step S33). Then, the CPU 21 returns to step S27 to repeat the processing. That is, the CPU 21 counts the number of times of cutting by the cutter 26 after the detection state of the first sensor 31 or the second sensor 32 changes.

If the count value is equal to or greater than the predetermined value in step S28 (step S28; YES), the CPU 21 detects that the waste bin 29 is full (step S34).

If the cutting processing has ended in step S25 (step S25; YES), the second waste bin full detection process ends when the cutting processing has ended in step S29 (step S29; YES) or after step S34.

As described above, according to the second embodiment, a predetermined value corresponding to the cutting mode and the detection states of the first sensor 31 and the second sensor 32 is set, and it is detected that the waste bin 29 is full when the number of times of cutting by the cutter 26 reaches the predetermined value. Therefore, it is possible to prevent a reduction in productivity due to removal of cutting waste by effectively utilizing the capacity of the waste bin 29 for cutting waste.

It is considered that the case where both the first sensor 31 and the second sensor 32 detect cutting waste is closer to a state in which the waste bin 29 is almost full than the case where one of the first sensor 31 and the second sensor 32 detects cutting waste. Therefore, in a case where both the first sensor 31 and the second sensor 32 detect cutting waste, a problem that occurs when the waste bin 29 becomes full can be avoided by setting the predetermined value smaller.

The description in each of the above embodiments is examples of the post-processing apparatus and the image forming system according to the present invention, and the present invention is not limited thereto. The detailed configuration and detailed operation of each unit of the apparatus can be appropriately changed without departing from the spirit of the present invention.

For example, the cutting mode classification method is not limited to the above example.

In each of the above embodiments, the case where paper is used as a sheet has been described. However, the material of a sheet is not limited to paper, and may be a sheet-like resin.

Although embodiments of the present invention have been described and illustrated in detail, the disclosed embodiments are made for purposes of illustration and example only and not limitation. The scope of the present invention should be interpreted by terms of the appended claims.

What is claimed is:

1. A post-processing apparatus, comprising:
a cutter that cuts a transported sheet;
a waste bin that stores a cutting waste generated by a cutting operation of the cutter and falling from the cutter;
a sensor that detects the cutting waste at a predetermined position in a depth direction in the waste bin; and
a hardware processor that controls the cutting operation of the cutter according to a cutting mode, sets a predetermined value according to the cutting mode when the sensor detects the cutting waste, counts the number of times of cutting by the cutter after the sensor starts to detect the cutting waste, and detects that the waste bin is full when the counted number of times of cutting reaches the predetermined value.

2. The post-processing apparatus according to claim 1, wherein, as the sensor, a first sensor and a second sensor provided at different positions in a feed direction of the sheet are provided, and
the hardware processor sets the predetermined value further according to detection states of the first sensor and the second sensor.

3. The post-processing apparatus according to claim 2, wherein the hardware processor sets the predetermined value when both the first sensor and the second sensor detect the cutting waste to be smaller than the predetermined value when one of the first sensor and the second sensor detects the cutting waste.

4. The post-processing apparatus according to claim 1, wherein the hardware processor determines the cutting mode based on a size, type, or basis weight of the sheet.

5. The post-processing apparatus according to claim 1, wherein the number of times of cutting counted by the hardware processor is the number of sheets cut by the cutter or the number of cutting operations of the cutter.

6. The post-processing apparatus according to claim 1, wherein the hardware processor changes a cutting position of the sheet according to the cutting mode.

7. The post-processing apparatus according to claim 1, wherein the hardware processor changes a shape or size of the cutting waste according to the cutting mode.

8. The post-processing apparatus according to claim 1, wherein the cutter is installable at a plurality of positions on a transport path of the sheet.

9. An image forming system, comprising:
an image forming apparatus that forms an image on a sheet; and
the post-processing apparatus according to claim 1.

* * * * *